United States Patent
Doyle et al.

(10) Patent No.: US 9,678,791 B2
(45) Date of Patent: *Jun. 13, 2017

(54) SHARED RESOURCES IN A DOCKED MOBILE ENVIRONMENT

(75) Inventors: Ronald Patrick Doyle, Raleigh, NC (US); David Louis Kaminsky, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 972 days.

This patent is subject to a terminal disclaimer.

(21) Appl. No.: 13/372,695

(22) Filed: Feb. 14, 2012

(65) Prior Publication Data

US 2013/0212586 A1   Aug. 15, 2013

(51) Int. Cl.
G06F 9/50 (2006.01)
G06F 9/46 (2006.01)
G06F 9/48 (2006.01)

(52) U.S. Cl.
CPC .......... *G06F 9/4881* (2013.01); *G06F 9/5044* (2013.01); *G06F 9/46* (2013.01); *G06F 9/50* (2013.01); *G06F 2209/501* (2013.01); *Y02B 60/142* (2013.01)

(58) Field of Classification Search
CPC ...... G06F 1/1632; G06F 13/00; G06F 9/4862; G06F 9/50; G06F 9/46; G06F 9/5044; G06F 9/4881; G06F 2209/501; Y02B 60/142
See application file for complete search history.

(56) References Cited

U.S. PATENT DOCUMENTS

| | | | |
|---|---|---|---|
| 6,098,091 A | 8/2000 | Kisor | |
| 6,282,596 B1 | 8/2001 | Bealkowski et al. | |
| 6,438,553 B1 | 8/2002 | Yamada | |
| 6,438,622 B1 | 8/2002 | Haghighi et al. | |
| 6,549,968 B1 | 4/2003 | Hart | |
| 6,591,324 B1 | 7/2003 | Chen et al. | |
| 6,993,615 B2 | 1/2006 | Falcon | |
| 7,043,588 B2 | 5/2006 | Konetski | |
| 7,111,300 B1 | 9/2006 | Salas et al. | |
| 8,230,425 B2 | 7/2012 | Ahuja et al. | |
| 8,429,660 B2 * | 4/2013 | Dweck et al. | 718/104 |

(Continued)

FOREIGN PATENT DOCUMENTS

EP   1515511   3/2005

OTHER PUBLICATIONS

Wang, Lei, and Michael Franz. "Automatic partitioning of object-oriented programs for resource-constrained mobile devices with multiple distribution objectives." Parallel and Distributed Systems, 2008. ICPADS'08. 14th IEEE International Conference on. IEEE, 2008.*

(Continued)

*Primary Examiner* — Benjamin Wu
*Assistant Examiner* — Caroline H Arcos
(74) *Attorney, Agent, or Firm* — DeLizio Law, PLLC

(57) ABSTRACT

A first and second data handling systems provides for shared resources in a docked mobile environment. The first data handling system maintains a set of execution tasks within the first data handling system having a system dock interface to physically couple to the second data handling system. The first data handling system assigns a task to be executed by the second data handling system while the two systems are physically coupled.

16 Claims, 5 Drawing Sheets

(56) References Cited

U.S. PATENT DOCUMENTS

| | | | |
|---|---|---|---|
| 2001/0041136 A1 | 11/2001 | Fujinaka | |
| 2003/0112585 A1 | 6/2003 | Silvester | |
| 2004/0250249 A1* | 12/2004 | Fukunari et al. | 718/100 |
| 2007/0025381 A1 | 2/2007 | Feng et al. | |
| 2007/0039003 A1 | 2/2007 | Meguro | |
| 2007/0076005 A1* | 4/2007 | Knepper et al. | 345/520 |
| 2007/0250653 A1 | 10/2007 | Jones | |
| 2009/0013171 A1 | 1/2009 | Gilling | |
| 2009/0254913 A1* | 10/2009 | Kawano et al. | 718/103 |
| 2010/0036991 A1 | 2/2010 | Lee | |
| 2010/0217912 A1* | 8/2010 | Rofougaran | 710/304 |
| 2010/0306469 A1 | 12/2010 | Ishiguro et al. | |
| 2010/0318999 A1* | 12/2010 | Zhao et al. | 718/104 |
| 2011/0041136 A1* | 2/2011 | Messier et al. | 718/105 |
| 2011/0099316 A1 | 4/2011 | Tseng et al. | |
| 2011/8999392 | 4/2011 | Conway | |
| 2011/0131358 A1 | 6/2011 | Ganesh et al. | |
| 2011/0231469 A1 | 9/2011 | Wolman et al. | |
| 2013/0212587 A1 | 8/2013 | Doyle et al. | |

OTHER PUBLICATIONS

Ou et al., "An Adaptive Multi-Constraint Partitioning Algorithm for Offloading in Pervasive Systems", Proceedings of the Fourth Annual IEEE International Conference on Pervasive Computing and Communications (PERCOM'06), 2006.*

Balan, et al. "tactics-based remote execution for mobile computing", cs.cmu.edu, proceedings of Symposium on networked systems design and implementation, Boston, MA, 2009, pp. 395-408.*

"PCT Application No. PCT/CA2013/050102 International Search Report", May 16, 2013, 3 pages.

Kemp, Roelof et al., "Cuckoo: a Computation Offloading Framework for Smartphones", asci.tudelft.nl//media/proceedings_asci_conference_2010/asci2010_submission_9.pdf (Obtained from the Internet on Nov. 19, 2013) Oct. 2010, 8 pages.

Ma, Ricky K. et al., "A Stack-On-Demand Execution Model for Elastic Computing", IEEE 39th International Conference on Parallel Processing hku.hk/~clwang/papers/icpp2010_sod_camera_ready.pdf (Obtained from the Internet on Nov. 19, 2013) Sep. 2010, 10 pages.

IBM TDB, et al., "A Method for Managing Users in a Networked and Disconnected Environment that Utilizes Shared Resources", IPCOM000014379D Jun. 19, 2003, 6 pages.

Kotz, et al., "Agent TCL: Targeting the Needs of Mobile Computers", Internet Computing IEEE, vol. 1, Issue 4 1997, pp. 58-67.

Larosa, et al., "A Docked-Aware Storage Architecture for Mobile Computing", CF Proceedings of 1st Conference on Computing Frontiers Apr. 2004, pp. 255-262.

Li, Fan et al., "Research on Mobile-Agent Based Data Access Model in Pervasive Computing Environment", APSCC IEEE Conference Dec. 2008, pp. 1523-1526.

"U.S. Appl. No. 13/777,007 Office Action", Mar. 6, 2015, 20 Pages.

"U.S. Appl. No. 13/777,007 Final Office Action", Aug. 14, 2015, 22 pages.

"U.S. Appl. No. 13/777,007 Office Action", Oct. 20, 2016, 29 pages.

* cited by examiner

Available Processors

| ProcessorID | System | Cores | Operating Frequency | Cache Size | ISA |
|---|---|---|---|---|---|
| P1 | Smartphone | 1 | 1GHz | 32kB-D 32kB-I | ARMv7 |
| P2 | Laptop | 2 | 2.1GHz | L1: 32kB-D 32kB-I L2: 2x256kB L3: 4MB | Intel64 |
| | | | | | |
| | | | | | |

502

Tasks

| Task-ID | Task-Type | Assigned Processor | Completion Status |
|---|---|---|---|
| T1 | Applet | P2 | Pending |
| T2 | Applet | P2 | Complete |
| T3 | Application | P2 | Pending |
| | | | |

SHARED RESOURCES IN A DOCKED MOBILE ENVIRONMENT

BACKGROUND

Embodiments of the inventive subject matter generally relate to the field of data handling system communication, and, more particularly, to cooperative task execution. Still more particularly, embodiments of the inventive subject matter relate to sharing of resources in a docked mobile environment.

Portable data handling systems such as smartphones, smartbooks, personal digital assistants (PDAs), palmtop computers, slate computers, tablet computers, netbooks, ultrabooks, and notebook computers have become ubiquitous. Increases in portability and battery life provided by such portable systems frequently require a concomitant reduction in processing power. Recent attempts to address the reduced computing capabilities found in such portable data handling systems have focused on increasing the input/output capabilities of smartphones or tablets by providing physical keyboards and displays. These conventional docking systems typically suffer from a number of shortcomings however as they typically depend on the processing capabilities of the more portable (and therefore less powerful in terms of processing power) device, they do not provide complete devices which are all useable independently of one another, and they do not provide for the capability to dock and undock systems rapidly without catastrophic effects on executing applications or other processing tasks.

SUMMARY

Embodiments of the inventive subject matter include a computer program product that comprises a computer-readable storage medium having a computer-usable program code embodied therewith. When executed by a first data handling system, the computer-usable program code causes said first data handling system to maintain a first set of data handling system execution tasks within the first data handling system. The described first data handling system comprises a first system unit comprising, a first processing element, a first memory storage element, a first user input element, and a first display element. The first system unit further comprises a system dock interface to physically couple the first data handling system to a second data handling system. The second data handling system comprises a second system unit which in turn comprises a second processing element, a second memory storage element, a second user input element, and a second display. The computer-usable program code causes the first data handling system to assign a task of the first set of data handling system execution tasks to be executed by the second data handling system while the first data handling system is physically coupled to the second data handling system. The computer-usable program code also causes the first data handling system to detect a physical decoupling of the first data handling system and second data handling system and to store an execution result of the task via the first memory storage element in response to a detection of the physical decoupling.

BRIEF DESCRIPTION OF THE DRAWINGS

The present embodiments may be better understood, and numerous objects, features, and advantages made apparent to those skilled in the art by referencing the accompanying drawings.

FIG. 5 depicts data structures utilized to store data processed according to an embodiment of the present invention.

DESCRIPTION OF EMBODIMENT(S)

Figure 1:
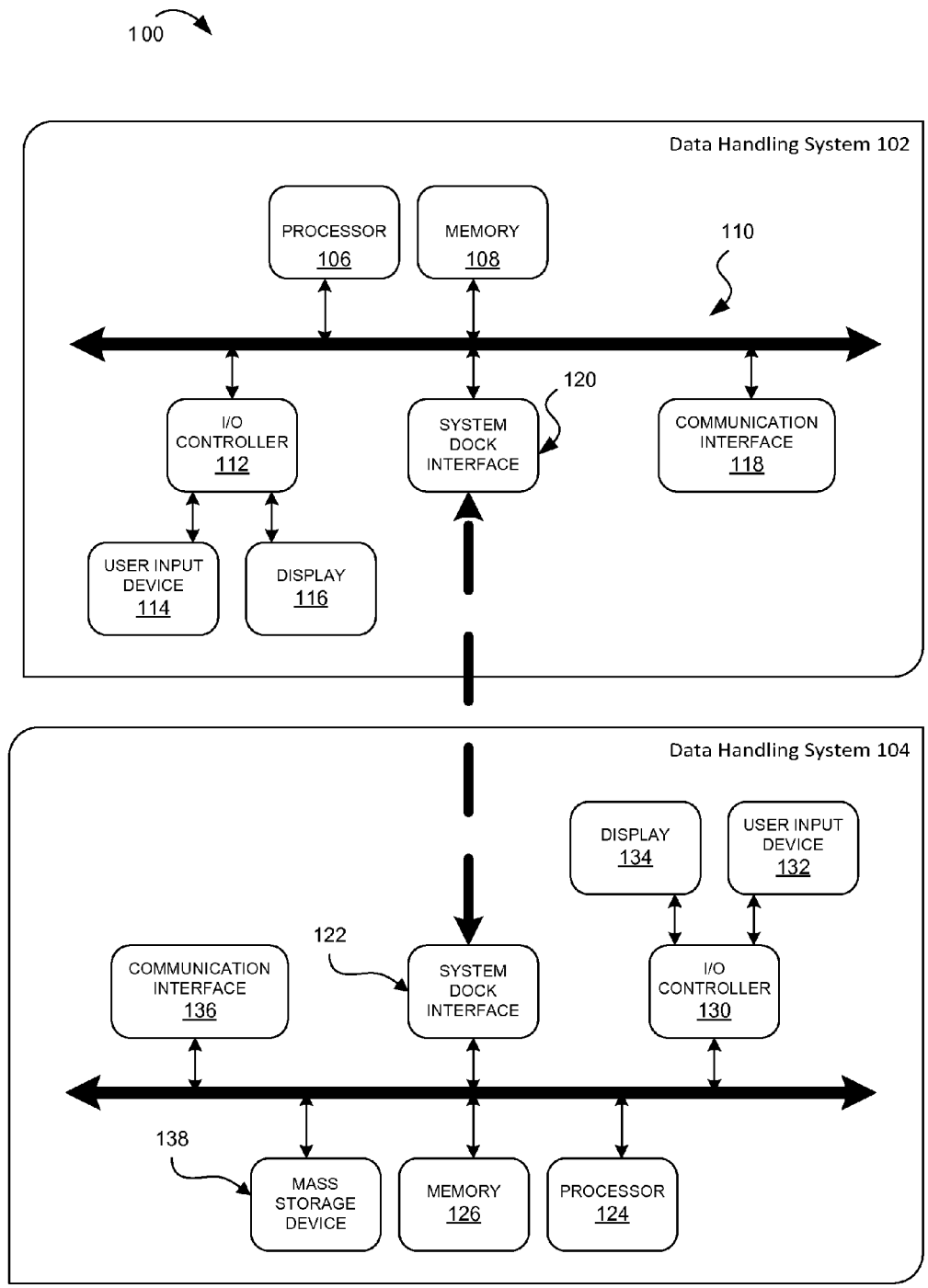
FIG. 1 depicts a system according to one embodiment of the present invention including first and second data handling systems.

The description that follows includes example systems, methods, techniques, instruction sequences and computer program products that embody techniques of the present inventive subject matter. However, it is understood that the described embodiments may be practiced without these specific details. For instance, although examples refer to specific data and data structures relating to the processing element capabilities and task completion status, these particular data and structures need not be used and should not be construed as limiting embodiments of the inventive subject matter disclosed herein. In other instances, well-known instruction instances, protocols, structures and techniques have not been shown in detail in order not to obfuscate the description.

Various embodiments of the inventive subject matter provide methods, systems, and computer program products for sharing resources in a docked mobile environment. The described embodiments enable scheduling of execution tasks or other processing "work" across multiple processors which cross physical device or "system unit" boundaries. Due to this cross-device distribution of execution tasks and the transient nature by which docked systems and operatively coupled together, embodiments must also provide a unique "failure" mode enabling a user to undock a system at any point while allowing processing to continue interrupted.

In the present description, many embodiments will be discussed which include only two docked data handling systems or devices, a primary or "main" first system and a secondary or "host" second system. As will be illustrated and described with respect to FIG. 2 however, embodiments of the present inventive subject matter are not limited to systems including only two devices. Additionally, embodiments provided and described herein allow any of a number of physically coupled data handling systems to serve as either a source or a target for task execution. In other words, a system may be "hosted" by another and still serve as a host to a third system and/or to the system that it is hosted by in a bidirectional relationship. Such embodiments also provide the capability of having "nested" data handling systems which may substantially augment processing capabilities while providing significant user flexibility, portability, and power efficiency.

In each case, it should be noted that the data handling systems described are each capable of standalone operation, including the requisite system resources to allow users to interact with them to request and receive task execution services.

According to one embodiment, each data handling system provides a java virtual machine (JVM). A java virtual machine is a virtual machine capable of executing Java bytecode. A virtual machine is a completely isolated guest operating system installation within a host operating system. Modern virtual machines are implemented with either software emulation or hardware virtualization. A JVM provides an environment in which Java bytecode can be executed, enabling such features as automated exception handling, which provides "root-cause" debugging information for every software error (exception), independent of the source code. A JVM is distributed along with a set of standard class libraries that implement the Java application programming interface (API). Appropriate APIs bundled together form the Java Runtime Environment (JRE). JVMs are available for many hardware and software platforms. The use of the same bytecode for all JVMs on all platforms allows Java to be described as a "compile once, run anywhere" programming language, as opposed to "write once, compile anywhere", which describes cross-platform compiled languages.

According to one embodiment, a method is provided in which a first execution task list is maintained. The task list includes in one embodiment task completion status information which indicates whether or not each identified task has completed execution. It should be noted that a task need not successfully complete and generate a desired result or outcome in order to be considered complete for task completion status purposes. According to one embodiment, task execution is deemed complete even if it results in an error (e.g., an exception) so long as the execution result is what would have occurred or have been expected to occur if the task in question were executed on the first data handling system from which it originated or on any of the other data handling systems physically coupled to the first data handling system per one or more embodiments of the inventive subject matter disclosed herein.

In this embodiment, the described first data handling system comprises a first system unit comprising, a first processing element, a first memory storage element, a first user input element, and a first display element. The first system unit further comprises a system dock interface to physically couple the first data handling system to a second data handling system. The second data handling system of the described embodiment comprises a second system unit which in turn comprises a second processing element, a second memory storage element, a second user input element, and a second display. The described method embodiment further comprises assigning a task of the first set of data handling system execution tasks to be executed by the second data handling system while the first data handling system is physically coupled to the second data handling system. The method also comprises detecting a physical decoupling of the first data handling system and second data handling system and storing an execution result of the task via the first memory storage element in response to a detection of the physical decoupling.

According to one embodiment, as the second data handling system is capable of independent, stand-alone execution of tasks, a second set of data handling system execution tasks is maintained for the second system and executed by the second data handling system in an interleaved fashion with tasks assigned from other, physically-coupled data handling systems (e.g., the first data handling system). Similarly, in one embodiment tasks sourced from a data handling system are distributed to be executed both locally as well as remotely, in other words, first data handling system execution tasks may be executed by either the first data handling system or another, physically-coupled data handling system, for example based on system availability, capability, and system dock interface availability as will be described in greater detail herein.

The stored execution result may be generated or supplied either by the first data handling system (if execution doesn't complete on the second data handling system prior to decoupling) or by the second data handling system if the task is executed successfully with a generated result be transferred from the second data handling system to the first data handling system via the system dock interface. In one embodiment, the task in question is assigned to the second data handling system and its completion status is tracked locally at the first data handling system, but the task is only reassigned for execution by the first data handling system if it is determined that decoupling occurred prior to a completion of the tasks' execution remotely at the second data handling system.

According to another embodiment, the task is assigned in parallel to both the first data handling system and the second data handling system. In the described embodiment, the processing capabilities of the second data handling system are comparatively superior to those of the first data handling system to the extent that, unless the data handling systems are decoupled from one another, execution (and result transfer) should occur before execution completes on the first data handling system. The execution result subsequently generated by the first data handling system may then be ignored or the execution may be suspended or halted once the task's execution is indicated as being completed by the second data handling system. Utilizing this implementation, execution latency may be reduced and perceived application or task execution responsiveness may be increased via this parallel execution of tasks.

In another embodiment, a predetermined time period may be used to detect a potential physical re-coupling or "re-docking" of systems. During the predetermined time period execution continues on the data handling system(s) to which tasks have been assigned. The task or tasks in question may either be reassigned immediately after a physical decoupling or "de-docking" or after the predetermined time period (or another predetermined time period) elapses. If re-docking occurs prior to the completion of execution of the task(s) by the source (i.e., first) data handling system, the execution result from the systems to which they were originally assigned is utilized.

According to one embodiment of the inventive subject matter disclosed herein, tasks are assigned based on data handling system capabilities. Such capabilities may consider a number of factors in separate embodiments. Traditional processing element benchmarks or capability metrics such as processor clock speed or cycle time, operations per cycle or second, processor cache size, instruction word size, etc. may be used. Similarly, actual benchmark testing results metrics may be utilized such as those provided by Business Applications Performance Corporation (BAPCo), the Embedded Microprocessor Benchmark Consortium (EEMBC), Standard Performance Evaluation Corporation (SPEC), the Transaction Processing Performance Council (TPC), Coremark, Whetstone, or the like. Processing workload specialties may also be taken into account or utilized as indicators of processing capability if a group of tasks to be executed is known a priori. For example, certain processors have enhanced floating point or integer execution priorities based on their instruction set or organization which would indicate increased performance for different execution workloads.

In another embodiment, processor utilization constraints are also considered in assigning tasks to be executed by physically coupled data handling systems. Because the docked and host systems described in the various embodiments discussed herein may be considered "peer" systems, in the described embodiment each system must manage or control the quantity of tasks sourced from other systems to be executed on its processing resources. This "throttling" may be accomplished using any of a number of techniques and may be taken into consideration in the assignment of tasks for execution. According to one embodiment, a token system is implemented in which each data handling system maintains a number of "tokens", data structures or other virtual constructs representing the number of available processing cycles for execution of other system's tasks. At a data handling system's request a token may be issued and/or redeemed by that data handling system corresponding to the execution of one task. By controlling the issuance of tokens, a data handling system may control the number of tasks executed (and correspondingly the number of processing element cycles consumed.

As utilized herein, a "task" may represent any quantifiable software work item. For example, a task may represent an individual java byte code, a subroutine, a method, a thread, a process, an applet, an application, or a set of applications comprising a business process or a portion thereof. In various embodiments of the inventive subject matter, a task is only constrained by what may be assigned and tracked for completion status and consequently can have almost any granularity. In one or more embodiments of the present inventive subject matter, a task may comprise any unit of work that, once completed, produces a result (which is comprised of one or more pieces of data), changes the state of the systems, produces an error or exception, or ends in other related outcomes.

FIG. 1 depicts a system according to one embodiment of the present invention including first and second data handling systems. The illustrated system 100 of FIG. 1 includes a first data handling system 102 and a second data handling system 104 as shown. First data handling system 102 comprises a processing element (processor 106) and a memory storage element (memory 108) communicatively coupled together via a bus 110 or other communication media, bridge, switch, or the like. First data handling system 102 further comprises an input/output (I/O) controller 112 for providing access and communication between first data handling system 102 and one or more I/O devices such as user input device 114 (e.g., a keyboard, mouse, trackpad, microphone, or the like) and display 116. First data handling system 102 additionally includes a "network" or communication interface 118 that include at least one wireless and/or wired network interface (e.g., a WLAN interface, a Bluetooth® interface, a WiMAX interface, a ZigBee® interface, a Wireless USB interface, USB interface, Ethernet interface, etc.).

First data handling system 102 further comprises a system dock interface 120 to couple first data handling system 102 to data handling system 104 via a corresponding system dock interface 122. In the embodiment of FIG. 1, system dock interfaces 120, 122 are utilized to directly physically couple first data handling system 102 and second data handling system 104 together. System dock interfaces 120, 122 therefore either make direct contact or connection with one another or are coupled via one or more intermediary mating modules or connection media as indicated via the depicted dashed line. Similar to first data handling system 102, second data handling system 104 comprises a processing element (processor 124) and a memory storage element (memory 126) communicatively coupled together via a bus 128 or other communication media, bridge, switch, or the like as well as an input/output (I/O) controller 130, user input device 132, display 134 and "network" or communication interface 136. Second data handling system 104 of the illustrated embodiment further includes a mass store device 138 (e.g., a direct access or solid state storage device) capable of providing greater storage capacity within second data handling system 104's storage hierarchy. In one embodiment, first data handling system 102 comprises a smartphone and second data handling system 104 comprises an ultrabook personal computer. While system dock interfaces 120, 122 have been depicted and described herein as direct physical connections, in other embodiments of the present inventive subject matter indirect connections may be utilized such as Wireless Universal Serial Bus (USB), Ultra-wideband, Bluetooth, Wifi/IEEE 802.11x, or the like.

Figure 2:
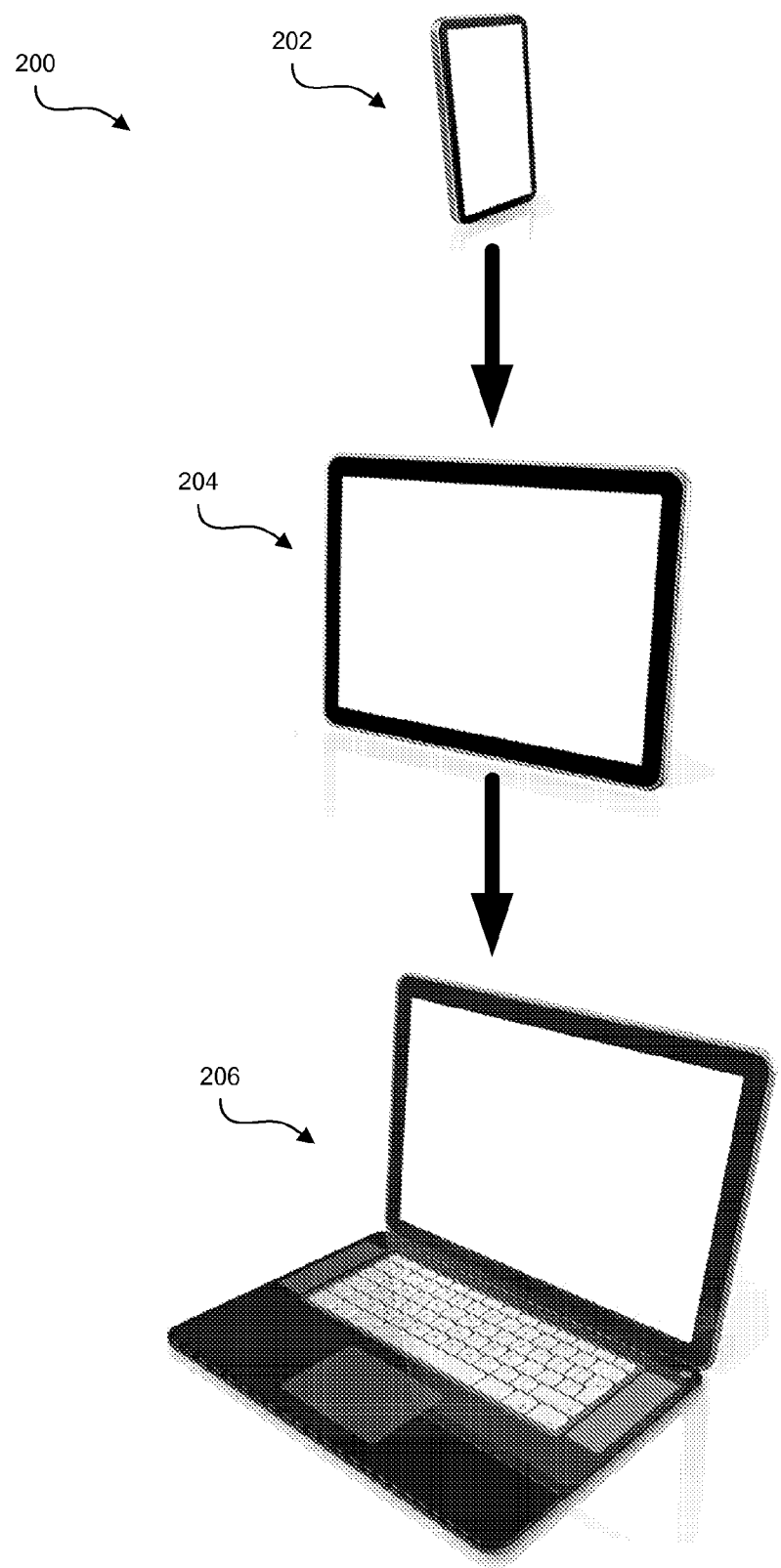
FIG. 2 depicts a high-level illustration of the docking of multiple data handling systems according to an embodiment of the present invention.

FIG. 2 depicts a high-level illustration of the docking of multiple data handling systems according to an embodiment of the present invention. As previously described, FIG. 2 shows a "nested" configuration system 200 in which a first data handling system (smartphone 202) is hosted by and physically coupled to a second data handling system (tablet computer 204) which is in turn hosted by and physically coupled to a third data handling system (notebook computer 206). It should be noted that "physically coupled" as used herein is indicative of more than mere physical contact. Rather, physically coupled devices as the term is utilized in the present description are capable of at least one of assigning or having assigned to them data handling system execution tasks to be executed. Moreover, although the term "hosted by" has been utilized to simplify the description, it should be noted that is different embodiments each of notebook computer 206, tablet computer 204, and smartphone 202 may be viewed as hosting or being hosted by its corresponding physically coupled peer devices.

Figure 3:
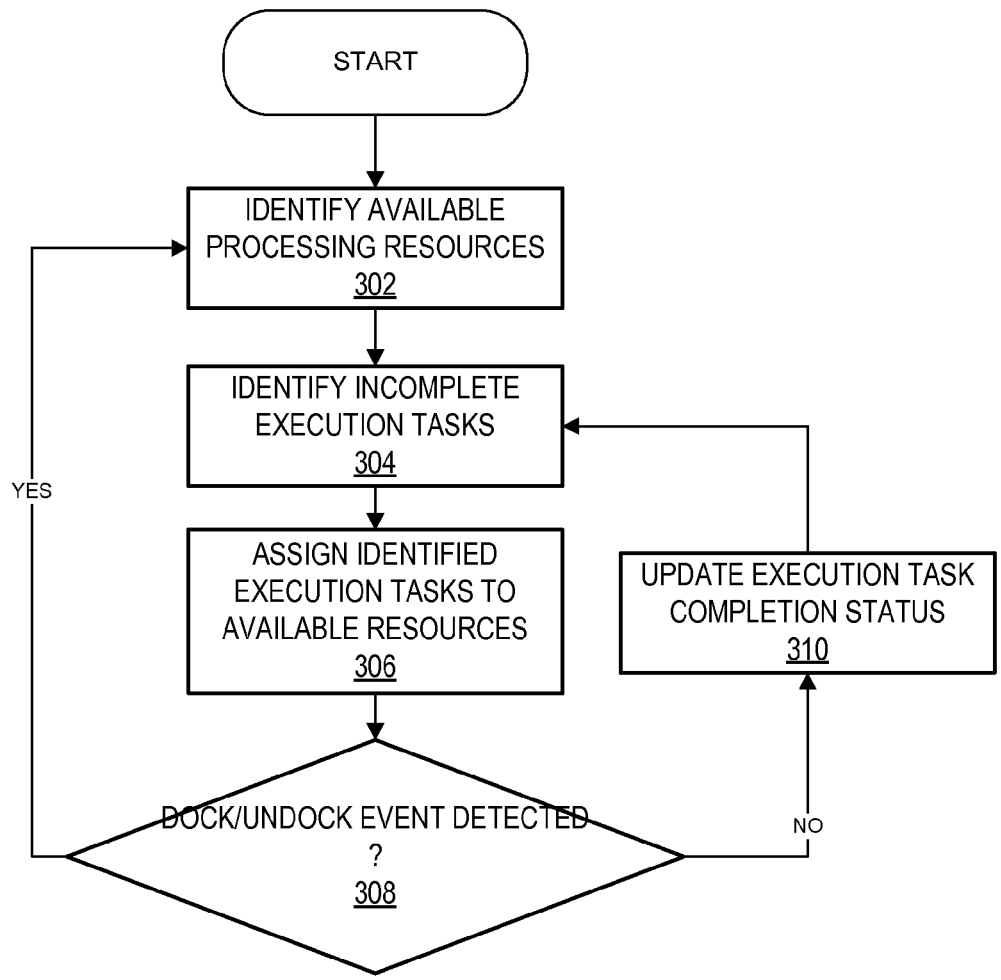
FIG. 3 depicts a high-level flow diagram of a process of sharing resources in a docked mobile environment according to an embodiment of the present invention.

FIG. 3 depicts a high-level flow diagram of a process of sharing resources in a docked mobile environment according to an embodiment of the present invention. According to one embodiment, the illustrated process may be performed by a task scheduler associated with a first data handling system. After the illustrated process begins, available processing resources are identified (process block 302). Such processing resources may comprise one or more processing elements, (e.g., a processing core or central processing unit (CPU), a microprocessor, a processor package, a graphics processing unit (GPU), a digital signal processor (DSP), a co-processor, arithmetic logic unit, floating-point unit, integer unit, programmable logic units, or the like). Similarly, such processing resources may comprise virtual processors comprising such processing elements such as a Java Virtual Machine. According to one embodiment, this identification is an iterative process in order to identify all resources which are accessible locally, within data handling systems directly physically coupled to the local system, as well as "nested" processing resources accessible indirectly via such directly coupled data handling systems.

Once all available or accessible processing resources have been identified, data handling system execution tasks which are indicated as incomplete using task completion status information are identified (process block 304). Such incomplete tasks may be either newly received data handling system execution tasks to be executed or data handling system execution tasks which have been previously received and assigned, but which were not completed by their assigned data handling system prior to the occurrence of a dock/de-dock event. Thereafter, the identified data handling system execution tasks are assigned to the previously identified available resources (process block 306). According to one embodiment, this assignment takes into consideration processing element or resource capabilities as well as any associated utilization constraints. Following task assignment, a determination is made whether or not a docking or de-docking event has occurred (process block 308).

In various inventive embodiments, different techniques may be used to identify such docking or de-docking events corresponding to the physical coupling or uncoupling of data handling systems operating according to such embodiments. In one illustrative embodiment, an interrupt technique may be used in conjunction with an interrupt handler routine to address such events occurring at any time during the depicted process. Consequently, the particular order and arrangement shown in FIG. 3 should not be construed as limiting. If a determination is made that a docking or de-docking event has occurred, the illustrated process returns to the stage at which available processing resources (excluding resources associated with "de-docked" data handling systems and including any resources associated with newly docked data handling systems) (process block 302). Otherwise, the process embodiment of FIG. 3 updates the execution task completion status of any completed tasks as appropriate (process block 310) before returning to the stage at which incomplete execution tasks are identified (process block 304).

Figure 4:
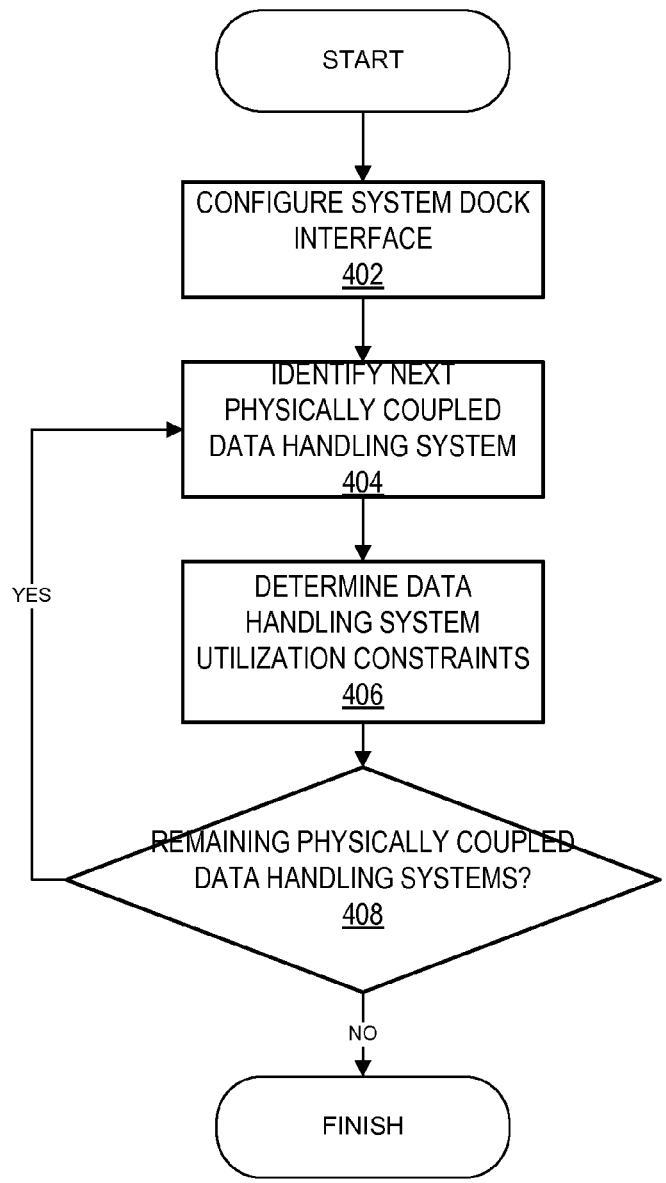
FIG. 4 depicts a high-level flow diagram of a process of identifying available resources according to an embodiment of the present invention as illustrated in FIG. 3.

FIG. 4 depicts a high-level flow diagram of a process of identifying available resources according to an embodiment of the present invention as illustrated in FIG. 3. As previously described herein, in order to identify all available/accessible processing resources, an iterative process must be utilized as shown in FIG. 4. Per the illustrated process, the system dock interface of an associated data handling system is first configured (process block 402) to enable communication of task assignments, execution results, processing capabilities and utilization constraints, etc. The particular initialization or configuration to be performed will be dependent on the specific system dock interface utilized as well as the data handling systems coupled thereto. Thereafter a "next" data handling system is identified (process block 404).

Although the term "next" has been utilized, embodiments of the inventive subject matter do not necessarily require that there be an ordering or precedence associated with the overall system's data handling system or devices. Rather this is merely intended to indicate that all available data handling systems and processing resources are identified. Thereafter any associated utilization constraints of a data handling system under consideration at this point in the process are determined (process block 406). A determination is then made whether there are any remaining physically coupled (directly or indirectly) data handling systems to be analyzed (process block 408). If all such "docked" data handling systems have been analyzed, the depicted process completes. Otherwise if there are other accessible data handling systems to be reviewed, the depicted process loops to the stage at which the "next" physically coupled data handling system to be analyzed is identified (process block 404) until all systems have been reviewed.

FIG. 5 depicts data structures utilized to store data processed according to an embodiment of the present invention. More specifically, FIG. 5 illustrates a first data structure 502 to store processor capability data and a second data structure 504 to store task completion status information. The processor capability data depicted in first data structure 502 includes a unique processor identified, an identifier of an associated data handling system, data indicating the number of processing cores available, the processor's operating frequency, cache size, and instruction set architecture. It should be appreciated that all of the indicated processor capability data is shown and described merely for illustrative purposes and should not be construed as limiting of the inventive embodiments discloses.

Such processor capability information may be useful in assigning data handling system execution tasks to be executed. For example, awareness of the specific data handling system associated with a processor may be used to indicate if a processor is "nested" or coupled to the source data handling system via a system dock interface or communication medium which may act as a bottleneck, slowing overall execution of tasks. Understanding of an instruction set architecture may be valuable where bytecodes may be compiled into or already available in the native machine code format to speed execution completion.

Similarly, the task completion status information depicted in second data structure 504 includes a unique task identifier, a task type identifier, an assigned processor, and a completion status. According to one embodiment of the inventive subject matter described herein, first and second data structures 502 and 504 and the data included therein is utilized to share available processing resources in a docked mobile environment. In one embodiment, data handling system execution tasks are assigned to the fastest available processor until either utilization constraints prevent additional task assignments or execution completion status degrades sufficiently to assign tasks to another available data handling system's processing resources.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable j apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations, it will be understood that these embodiments are illustrative and that the scope of the inventive subject matter is not limited to them. In general, techniques for sharing resources in a docked mobile environment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product comprising a computer memory having computer-usable program code embodied therewith, the computer-usable program code to:
   maintain, at a first data handling system, a task list comprising a first set of tasks for the first data handling system;
   detect a physical coupling of the first data handling system with a second data handling system via a system dock interface;
   in response to the physical coupling:
      determine processing capabilities and utilization constraints of the first data handling system and of the second data handling system, the processing capabilities and utilization constraints of the second data handling system based, at least in part, on the second data handling system capability to interleave execution of a portion of the first set of tasks into a second set of tasks for the second data handling system;
      assign one or more tasks from said first set of tasks of the first data handling system to be executed by the second data handling system, wherein assignment of the first set of tasks is based, at least in part, on the processing capabilities and utilization constraints of the first and second data handling systems;
      update the task list to indicate to which of the first data handling system or the second data handling system the one or more tasks of the first set of tasks is assigned;
      after generation of an execution result for a corresponding one of the first set of tasks, update an execution completion status in the task list to indicate a completion of the corresponding one of the first set of tasks;
   detect a physical decoupling of the first data handling system and the second data handling system via the system dock interface; and
   in response to the physical decoupling:
      determine, by the first data handling system, that the execution completion status does not indicate the completion of the one or more of the tasks of the first set of tasks that was assigned to the second data handling system; and
      re-assign the one or more tasks, without the execution completion status indicating the completion, to the first data handling system.

2. The computer program product of claim 1, wherein the computer-usable program code further comprises computer-usable program code to:
assign one or more other tasks of said first set of tasks to be executed in parallel by said first data handling system and said second data handling system while said first data handling system is physically coupled to said second data handling system.

3. The computer program product of claim 1, wherein the computer-usable program code further comprises computer-usable program code to determine processing capabilities of a third data handling system that is physically coupled with either the first data handling system or the second data handling system.

4. The computer program product of claim 3, wherein the computer usable program code further comprises the computer-usable program code to:
assign one or more other tasks from said first set of tasks to be executed by one or more of the first data handling system, the second data handling system, or the third data handling system while said first, second, and third data handling systems are physically coupled, wherein assignment of the first set of tasks is based, at least in part, on the processing capabilities of the first, second, and third data handling systems.

5. The computer program product of claim 1, wherein the computer-usable program code further comprises computer-usable program code to store information indicating the determined processing capabilities and utilization constraints for the second data handling system.

6. The computer program product of claim 5, wherein the information indicates at least one of:
a number of processors;
a number of processing cores;
a processor operating frequency;
a processor cache size;
an instruction set architecture; and
a memory size.

7. The computer program product of claim 1, wherein the computer-usable program code to detect the physical decoupling of said first data handling system and said second data handling system comprises computer-usable program code to determine that an interrupt indicates the physical decoupling of said first data handling system and said second data handling system.

8. The computer program product of claim 1, wherein updating the execution completion status in the task list to indicate the completion includes indicating an execution resulting in success or an execution resulting in an error.

9. A first data handling system comprising:
a first processing element;
a system dock interface to physically couple said first data handling system to a second data handling system;
a first memory storage element, coupled to said first processing element, to store computer-useable program code, which when executed by said first processing element, causes said first processing element to:
maintain, at the first data handling system, a task list comprising a first set of tasks for the first data handling system;
detect a physical coupling of the first data handling system with the second data handling system via the system dock interface;
in response to the physical coupling:
determine processing capabilities and utilization constraints of the second data handling system, the processing capabilities and utilization constraints of the second data handling system based, at least in part, on the second data handling system capability to interleave execution of a portion of the first set of tasks into a second set of tasks for the second data handling system;
assign one or more tasks from said first set of tasks of the first data handling system to be executed by the second data handling system, wherein assignment of the first set of tasks is based, at least in part, on the processing capabilities and utilization constraints of the first and second data handling systems;
update the task list to indicate to which of the first data handling system or the second data handling system the one or more tasks of the first set of tasks is assigned;
after generation of an execution result for a corresponding one of the first set of tasks, update an execution completion status in the task list to indicate a completion of the corresponding one of the first set of tasks to indicate completion;
detect a physical decoupling of the first data handling system and the second data handling system via the system dock interface; and
in response to the physical decoupling:
determine, by the first data handling system, that the execution completion status does not indicate the completion of the one or more of the tasks of the first set of tasks that was assigned to the second data handling system; and
re-assign the one or more tasks, without the execution completion status indicating the completion, to the first data handling system.

10. The first data handling system of claim 9, wherein the computer usable program code is further executable to cause the first processing element to:
assign one or more other tasks of said first set of tasks to be executed in parallel by said first data handling system and said second data handling system while said first data handling system is physically coupled to said second data handling system.

11. The first data handling system of claim 9, wherein the computer usable program code is further executable to cause the first processing element to determine processing capabilities of a third data handling system that is physically coupled with either the first data handling system or the second data handling system.

12. The first data handling system of claim 11, wherein the computer usable program code is further executable to cause the first processing element to:
assign one or more other tasks from said first set of tasks to be executed by one or more of the first data handling system, the second data handling system, or the third data handling system while said first, second, and third data handling systems are physically coupled, wherein assignment of the first set of tasks is based, at least in part, on the processing capabilities of the first, second, and third data handling systems.

13. The first data handling system of claim 9, wherein the computer usable program code is further executable to cause the first processing element to store information indicating the determined processing capabilities and utilization constraints for the second data handling system.

14. The first data handling system of claim 13, wherein the information indicates at least one of:
a number of processors;
a number of processing cores;

a processor operating frequency;
a processor cache size;
an instruction set architecture; and
a memory size.

15. The first data handling system of claim 9, wherein the computer usable program code to detect the physical decoupling of said first data handling system and said second data handling system comprises computer usable program code executable to cause the first processing element to determine that an interrupt indicates the physical decoupling of said first data handling system and said second data handling system.

16. The first data handling system of claim 9, wherein updating the execution completion status in the task list to indicate the completion includes indicating an execution resulting in success or an execution result resulting in an error.

* * * * *